Jan. 5, 1943.  H. J. LUTZ  2,307,327

MEAT LOOP

Filed April 15, 1941

INVENTOR.
Harold J. Lutz
BY
ATTORNEY.

Patented Jan. 5, 1943

2,307,327

UNITED STATES PATENT OFFICE 2,307,327

MEAT LOOP

Harold J. Lutz, Kansas City, Mo.

Application April 15, 1941, Serial No. 388,619

2 Claims. (Cl. 17—44.2)

This invention relates to a new article of manufacture in the nature of means for hanging meat or the like, and has for its primary object the provision of a unitary element specially formed to engage parts of the carcass to be hung in storage, which element is constructed of rust and acid proof material and formed to be moved to position by a tool, to the end that a strong and adequate supporting means is presented that will not cause an undue and undesirable amount of spoilage and which engages but a relatively small part of the meat.

Another important object of this invention is to provide a meat loop, the body of which is specially formed to present a circumscribing element created of a single piece of wire that is bent for the purpose of forming such an element, and that is further made with an eye at one end and a straight section at the other end thereof, which eye and straight section are initially spaced apart to present a gap that is closed by reducing the radius of the circumscribing element after the loop has been placed around that part of the meat that it is desired the loop engage.

This invention has for a yet further aim the provision of a meat loop formed of material and as above mentioned, but having a sharpened end and a straight section, quickly movable to a locked position with an eye formed on the other end of the loop, whereby a hook may be established on said pointed end to embrace a part of the material forming the eye.

Other objects of the invention and the manner of constructing and employing the meat loop, will appear during the course of the following specification referring to the accompanying drawing wherein.

Figure 1:
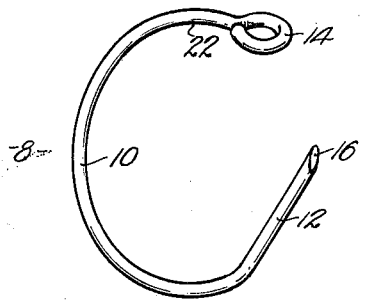
Fig. 1 is a perspective view of a meat loop made in accordance with the present invention.
Figure 2:
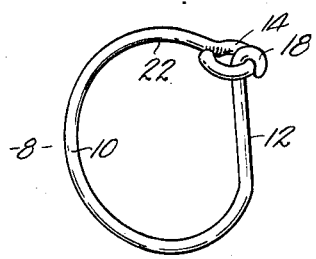
Fig. 2 is a similar perspective view showing the component parts of the loop in the operative position but separate from any material being supported.
Figure 3:
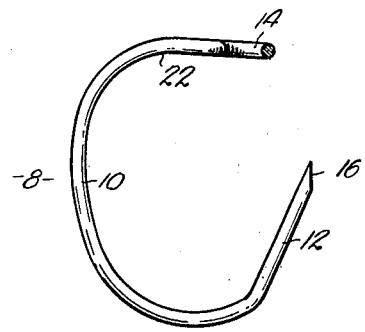
Fig. 3 is a side elevational view with the eye in section showing the loop with open gap.

Heretofore it has been common practice to hang pieces of meat in storage through the employment of relatively large hooks, the surfaces of which engage extensive areas of the meat and thereby establish spoilage. Meat hooks of conventional character have apparently been used by the trade because of their strength, and further, because no means has as yet been devised, so far as I am aware, of quickly attaching a small loop that could support the weight necessary and be hung and moved as much as required in the handling of meat for the trade.

The article of manufacture in the nature of the meat loop illustrated in the accompanying drawing and about to be described, may be affixed through the employment of a hand operated machine, due to its special novel form, and because of the inherent characteristic of the material from which the loop is formed.

In the drawing numeral 8 designates generally the loop which is constructed of a single piece of wire which must be rust and acid resisting and capable of engaging the meat without contaminating the same. The single piece of wire is arched to present an arcuate portion 10 and a straight length 12.

An eye 14 formed at one end of the length of wire receives a part of straight length 12, as will hereinafter be more fully set down.

The straight section 12 is provided with a sharp point 16 that is created when the wire is cut to length. The diagonal cut is capable of establishing the point 16 and no further tooling is necessary.

Figure 4:
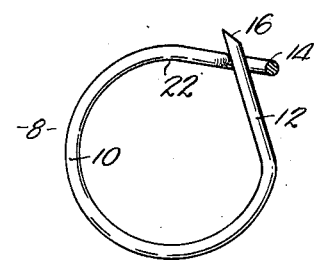
Fig. 4 is a similar view illustrating the relative position of the parts of the loop when the pointed end is first moved through the loop.

Eye 14 is disposed in a plane perpendicular to and intersecting the major plane of the circumscribing element composed of sections 10 and 12. Initially bending arcuate section 10 of the loop insures that when pressure is exerted upon that section opposite to the gap formed between eye 14 and pointed end 16, further arching will occur. Due to the angularity of straight section 12 and its position with respect to arcuate section 10, pointed end 16 will move to the position shown in Fig. 4 where further action of the applying machine may form hook 18 to engage a portion of eye 14.

Figure 6:
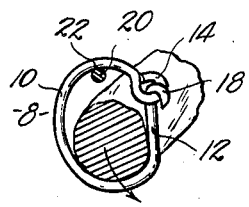
Fig. 6 is a sectional view illustrating the manner in which the loop engages a piece of meat.

Loops made as above mentioned will be found extremely effective in engaging the spinal column of a carcass because they engage between the vertabrae of said column and do not touch the meat which, if spoiled, would represent a loss to the merchant. Fig. 6 indicates the position of the loop when engaging the cartilage between the vertabrae.

When the loop is applied it should not circumscribe material that would completely fill the opening. Enough of the loop is left to permit hanging on the rack or engaging any structural member, such as a peg or nail 20.

Figure 5:
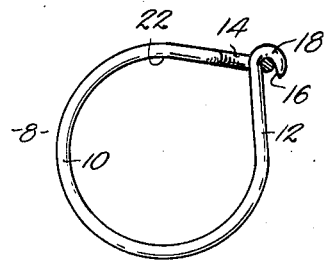
Fig. 5 is a view similar to Fig. 4, but with the pointed end turned to create a hook.

A support engaging zone 22 is established in inner face of the arcuate section 10 adjacent to eye 14 where two downwardly and outwardly extending portions thereof meet (Figs. 4 and 5), whereby upon application of the loop, nail 20 is engaged in a manner to further insure that the weight of the meat will be forced against straight section 12 to hold the base of hook 18 against the eye.

The position of the loop is such that the weight exerts a downward pull in the direction of the arrow shown in Fig. 6, and the tendency is therefore, to force the straight section 12 against the inner face of eye 14 to prevent opening of hook 18.

In actual use, a loop made as specified and of wire having a diameter of less than ⅛ in. has withstood a downward pull of 225 lbs. The entire loop is of semi-rigid material and just pliable enough to permit the manually operated machine to form hook 18 and further bend arcuate section 10 as indicated above.

This loop is useful in hanging all types of meat, cuts, hams, bacon and portions of the entire carcass but the application of the loop is preferably such that the inclined face of arcuate section 10 tends to shift the weight against straight section 12 in a fashion to prevent accidental opening of hook 18. A die for constructing the loop is an inexpensive piece of equipment and the machine for applying is relatively simple and easy to manipulate.

Having thus described the invention, what is claimed as new and desired to be secured by Letters Patent is:

1. A meat loop consisting of a single piece of rust and acid resisting wire; said loop having an eye at one end, the eye being disposed in a plane intersecting the major plane of the loop, an arcuate portion adjacent the eye, a straight portion adjacent the arcuate portion, and a point on the outer end of the straight portion, the point being adapted to enter the eye when the arcuate portion is bent to reduce its radius.

2. A meat loop consisting of a single piece of semi-rigid material; said loop having an eye at one end, the eye being disposed in a plane perpendicular to and intersecting the major plane of the loop, a support engaging portion adjacent the eye, an arcuate portion adjacent the support engaging portion, a straight portion adjacent the arcuate portion, and a hook adjacent the straight portion, the hook embracing the outermost part of the eye, whereby when the loop is in use and the support engaging portion is upon a support, the inclined inner face of the arcuate portion urges the weight of the circumscribed substance against the straight portion to force the hook into tight engagement with the eye.

HAROLD J. LUTZ.